US011599144B1

(12) United States Patent
Ellis et al.

(10) Patent No.: US 11,599,144 B1
(45) Date of Patent: Mar. 7, 2023

(54) STRAP ADJUSTMENT MECHANISM

(71) Applicant: META PLATFORMS TECHNOLOGIES, LLC, Menlo Park, CA (US)

(72) Inventors: Shane Michael Ellis, Bellevue, WA (US); Yi-yaun Chen, Seattle, WA (US); Brian Lawrence Chuang, Seattle, WA (US); David Michael Pickett, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 639 days.

(21) Appl. No.: 16/667,764

(22) Filed: Oct. 29, 2019

(51) Int. Cl.
*G06F 1/16* (2006.01)
*G02C 3/00* (2006.01)
*A42B 3/08* (2006.01)
*G02B 27/01* (2006.01)

(52) U.S. Cl.
CPC ............... *G06F 1/163* (2013.01); *A42B 3/08* (2013.01); *G02C 3/003* (2013.01); *G02B 27/0176* (2013.01)

(58) Field of Classification Search
CPC ........... G06F 1/163; A42B 3/08; G02C 3/003; G02B 27/0176
USPC ................. 345/8, 7; 224/181, 101; D14/372
See application file for complete search history.

(56) References Cited

U.S. PATENT DOCUMENTS 10,338,637 B1 * 7/2019 Bristol ...................... A45F 5/00

OTHER PUBLICATIONS

Dave Lee, "Daydream: Google's hot take on affordable VR", Nov. 10, 2016 https://www.bbc.com/news/technology-37936942 (Year: 2016).*
InstaVR, "Why You Should Publish VR Apps for Google Daydream", May 26, 2017 https://www.instavr.co/articles/general/why-you-should-publish-vr-apps-for-google-daydream (Year: 2017).*

* cited by examiner

*Primary Examiner* — Tuyen Tra
(74) *Attorney, Agent, or Firm* — Greenberg Traurig, LLP

(57) ABSTRACT

The disclosed computer-implemented method may a strap adjustment mechanism having a first strap and a second strap positioned to at least partially overlap the first strap. The strap adjustment mechanism may also include a first strap adjuster, and a proximal portion of the first strap may be coupled to the first strap adjuster and the second strap is threaded through the first strap adjuster. In addition, the strap adjustment mechanism may include a second strap adjuster, and a proximal portion of the second strap is coupled to the second strap adjuster and the first strap is threaded through the second strap adjuster. Various other devices, systems, and methods are also disclosed.

20 Claims, 13 Drawing Sheets

STRAP ADJUSTMENT MECHANISM

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
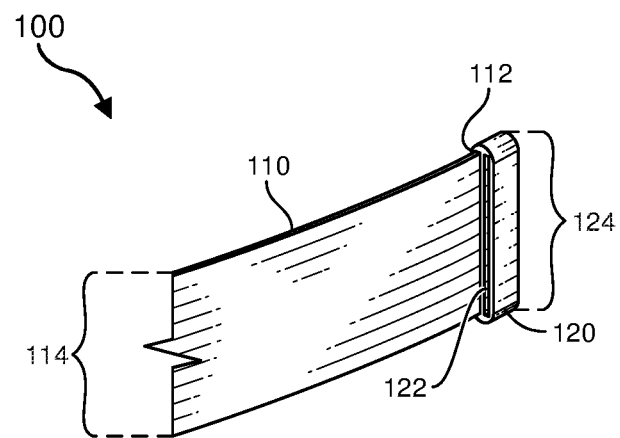
FIG. 1A is a diagram of an exemplary strap adjuster.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Putting on a virtual reality headset may be the beginning of a thrilling experience, one that may be more immersive than almost any other digital entertainment or simulation experience available today. Artificial reality headsets may enable users to travel through space and time, interact with friends in a three-dimensional world, or play video games in a radically redefined way. Artificial-reality headsets may also be used for purposes other than recreation—governments may use them for military training simulations, doctors may use them to practice surgery, and engineers may use them as visualization aids.

In any use of an artificial reality headset, making the experience as immersive as possible may be critical. Regrettably, a variety of factors may disrupt virtual-reality immersion, and one of the most significant disruptions to having an immersive experience may be an ill-fitting headset. Traditional artificial reality headsets may provide some options for addressing a poor fit, but these options may be suboptimal. For example, adjusting a traditional headset for comfortable facial pressure and proper size may involve making numerous manual changes over several fitting attempts. This process may be surprisingly time-consuming, and for some users, finding a good fit may be quite difficult. The problem of achieving a good fit may be exacerbated for headsets that are used by multiple people, which may necessitate a refitting before each use. And finding a good fit isn't the only problem with using artificial reality headsets—the configuration of some traditional headset straps may result in awkward, uncomfortable, or comical attempts at putting on or removing headsets.

The present disclosure is generally directed to strap adjustment devices and systems for wearable devices (e.g., artificial-reality headsets) and/or any other suitable devices. In some embodiments, a strap adjustment mechanism may include two strap adjusters coupled to the ends of two straps that are each threaded through the other strap adjuster. In other words, an example strap adjustment mechanism may include a first strap, a second strap positioned to at least partially overlap the first strap, and first and second strap adjusters. A proximal portion of the first strap may be coupled to the first strap adjuster and the second strap may be threaded through the first strap adjuster. Similarly, a proximal portion of the second strap may be coupled to the second strap adjuster and the first strap may be threaded through the second strap adjuster. Such a configuration may enable a user to quickly and easily adjust the strap adjustment mechanism to find a comfortable and effective fit of a head-mounted display. Embodiments of the present disclosure may also provide a number of other features and advantages and/or may be used with a variety of other types of devices, as will be appreciated in view of the disclosure provided herein.

Figure 5A:
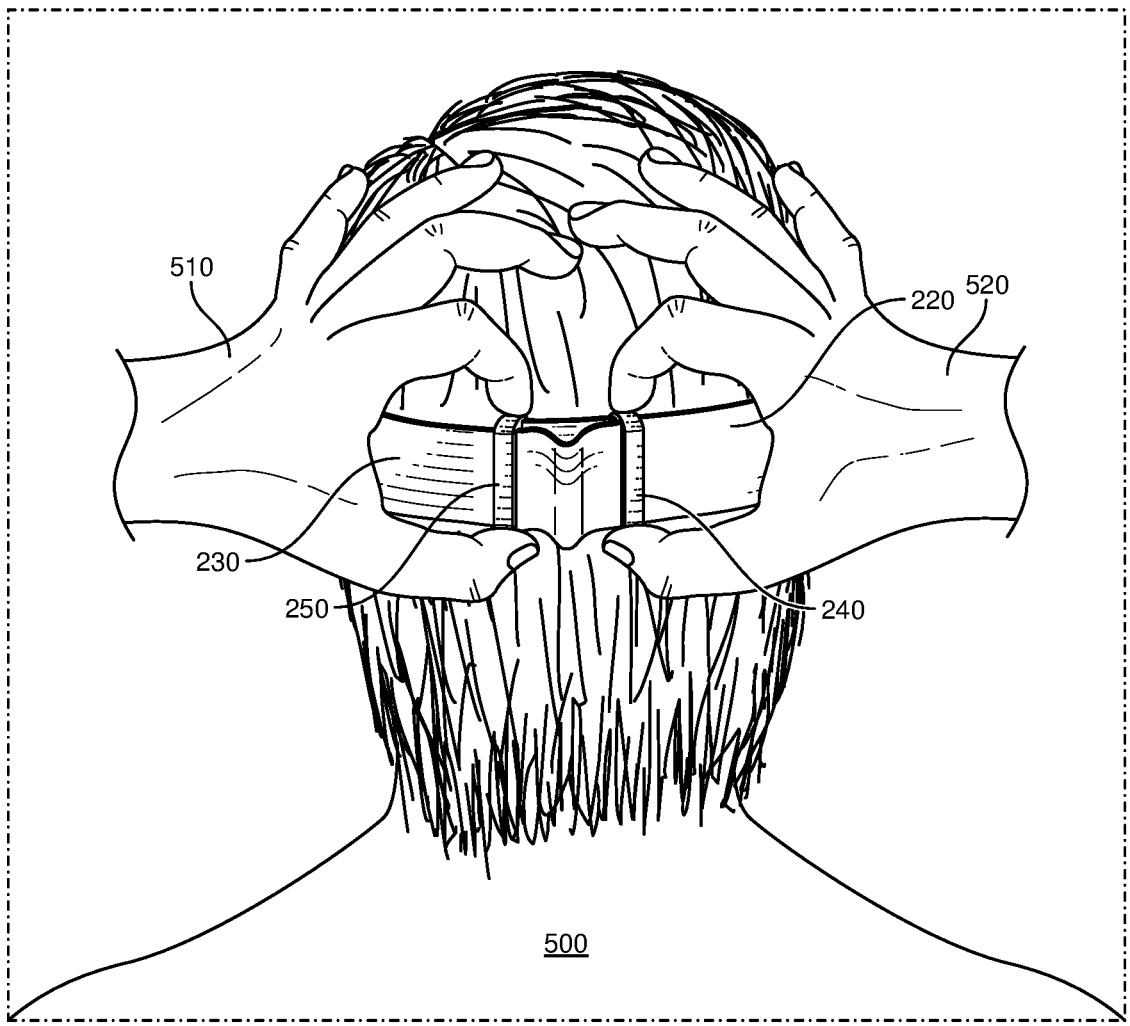
FIG. 5A is a diagram of a user adjusting an example strap adjustment mechanism.
Figure 5B:
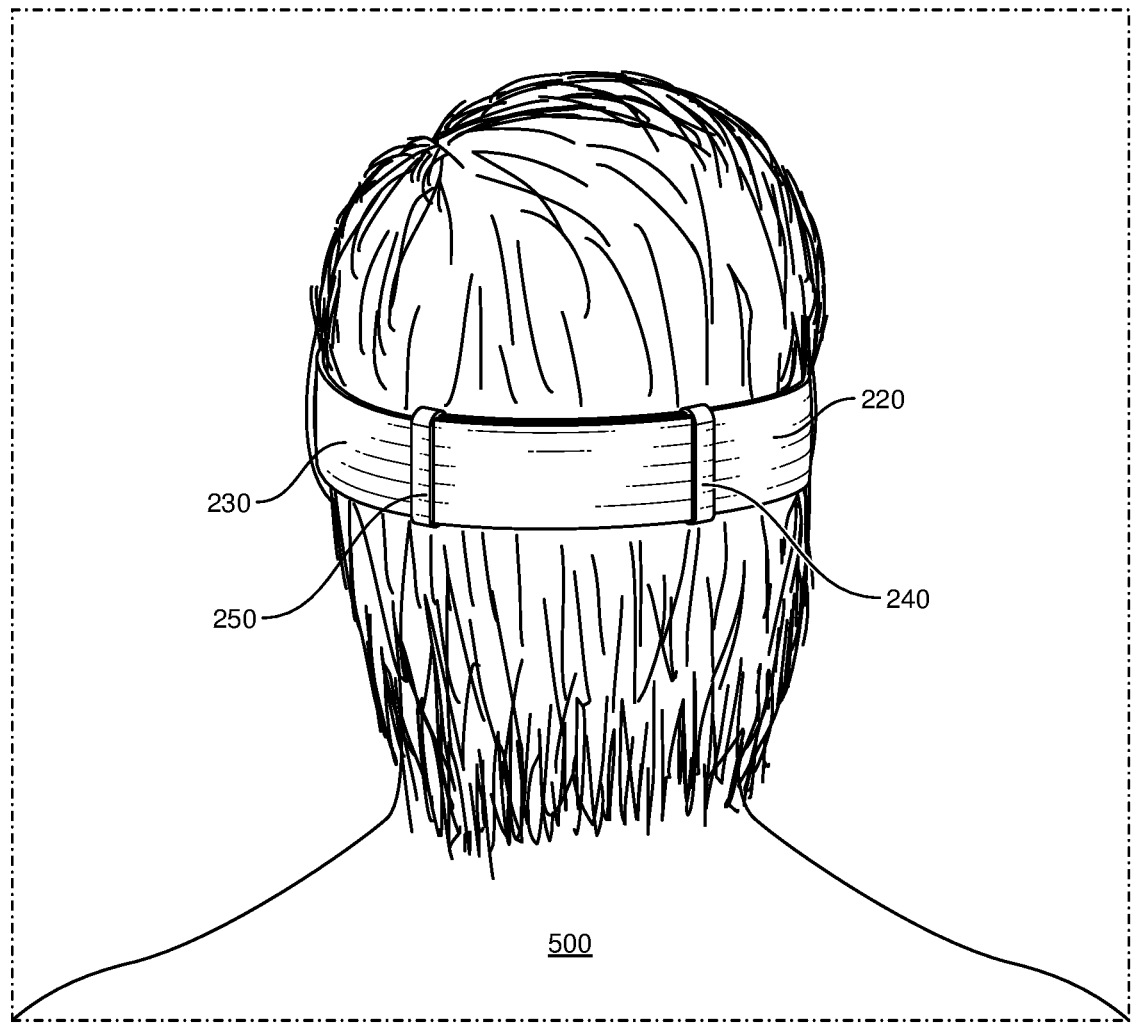
FIG. 5B is a diagram of the strap adjustment mechanism shown in FIG. 4A after being tightened by a user.
Figure 6:
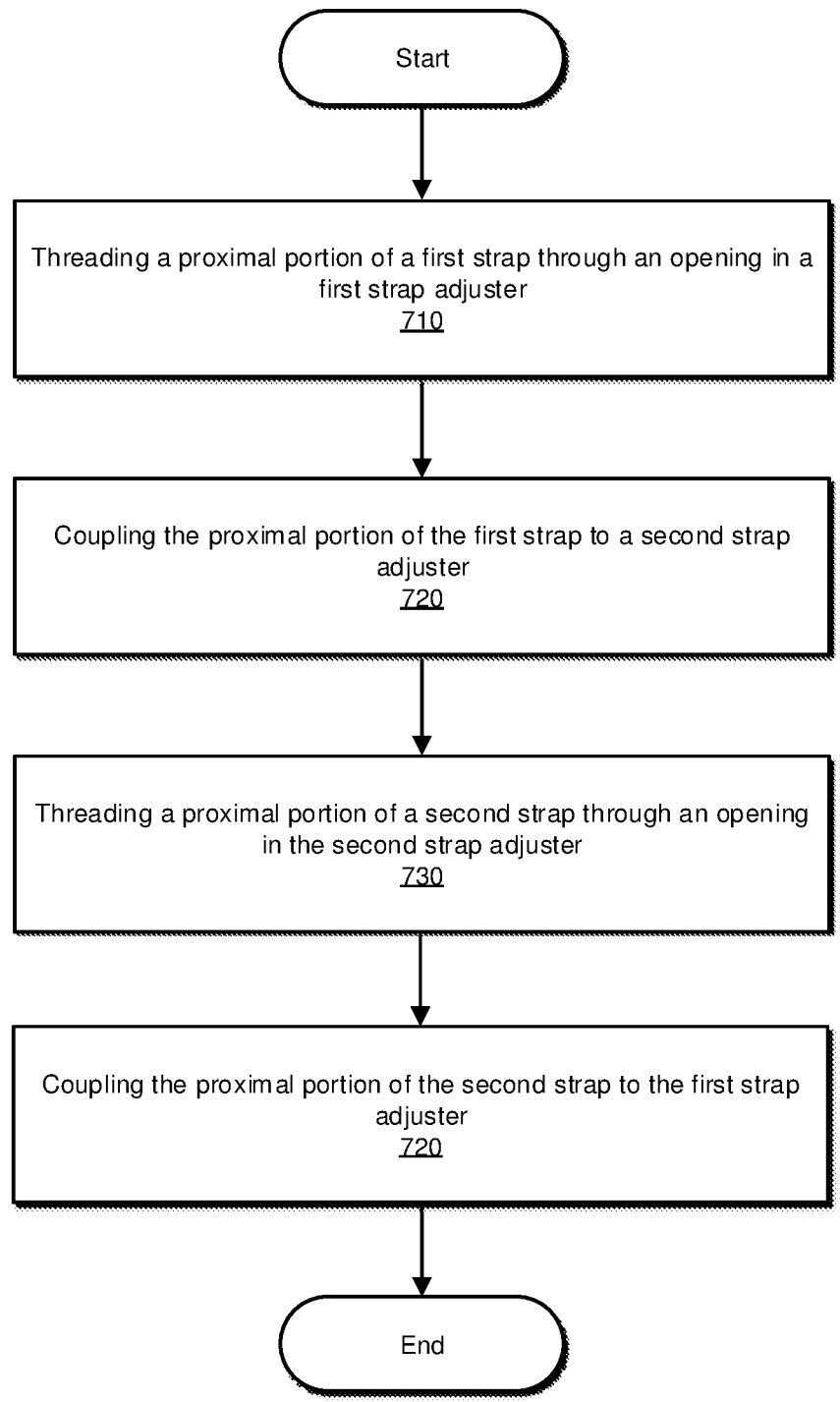
FIG. 6 is a flow diagram of an example method of manufacturing a strap adjustment mechanism.
Figure 7:
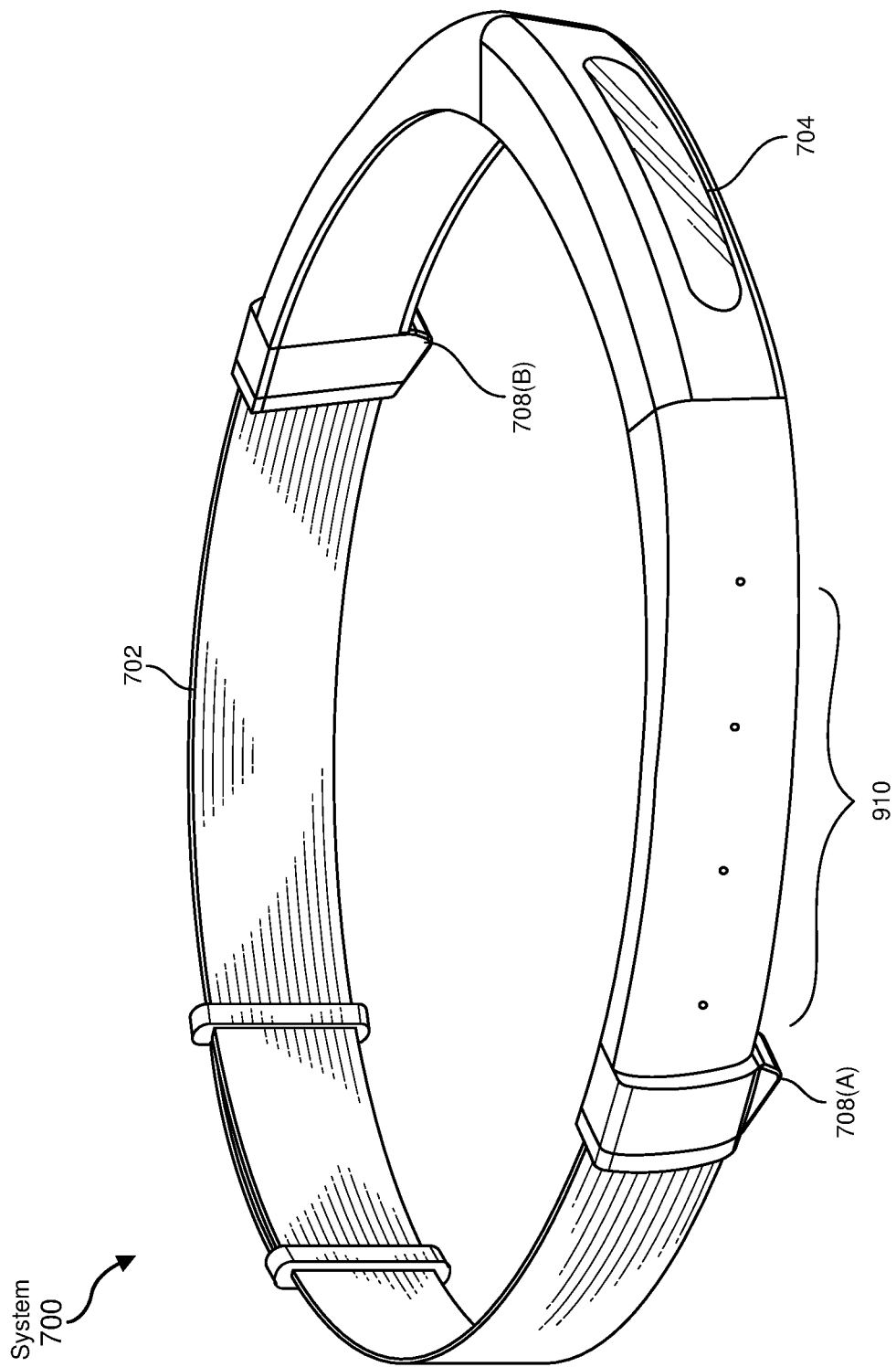
FIG. 7 is a diagram of an example artificial-reality headband in which the strap adjustment mechanisms disclosed herein may be implemented.
Figure 8:
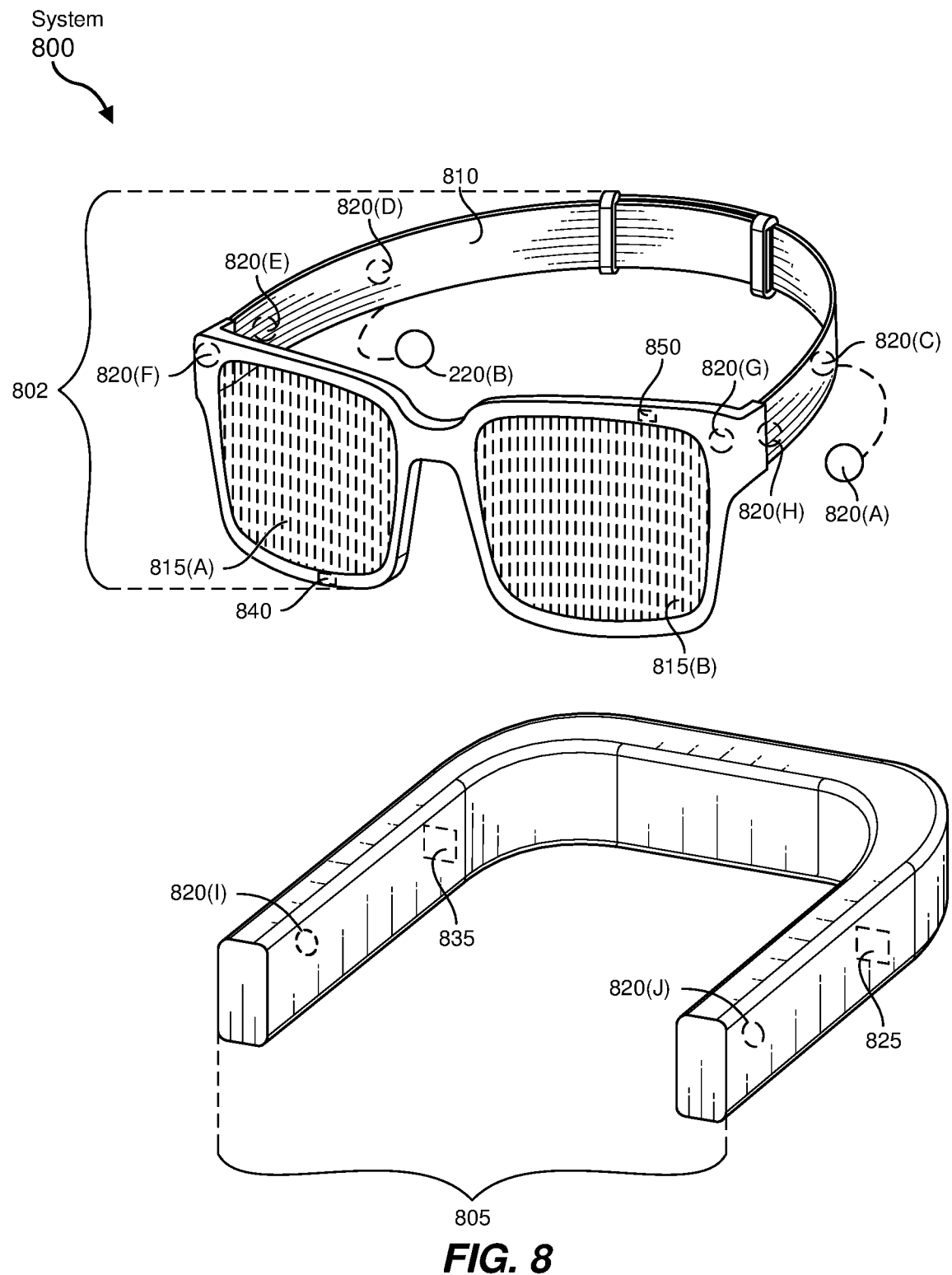
FIG. 8 is a diagram an example of augmented-reality glasses in which the strap-adjustment mechanisms disclosed herein may be implemented.
Figure 9:
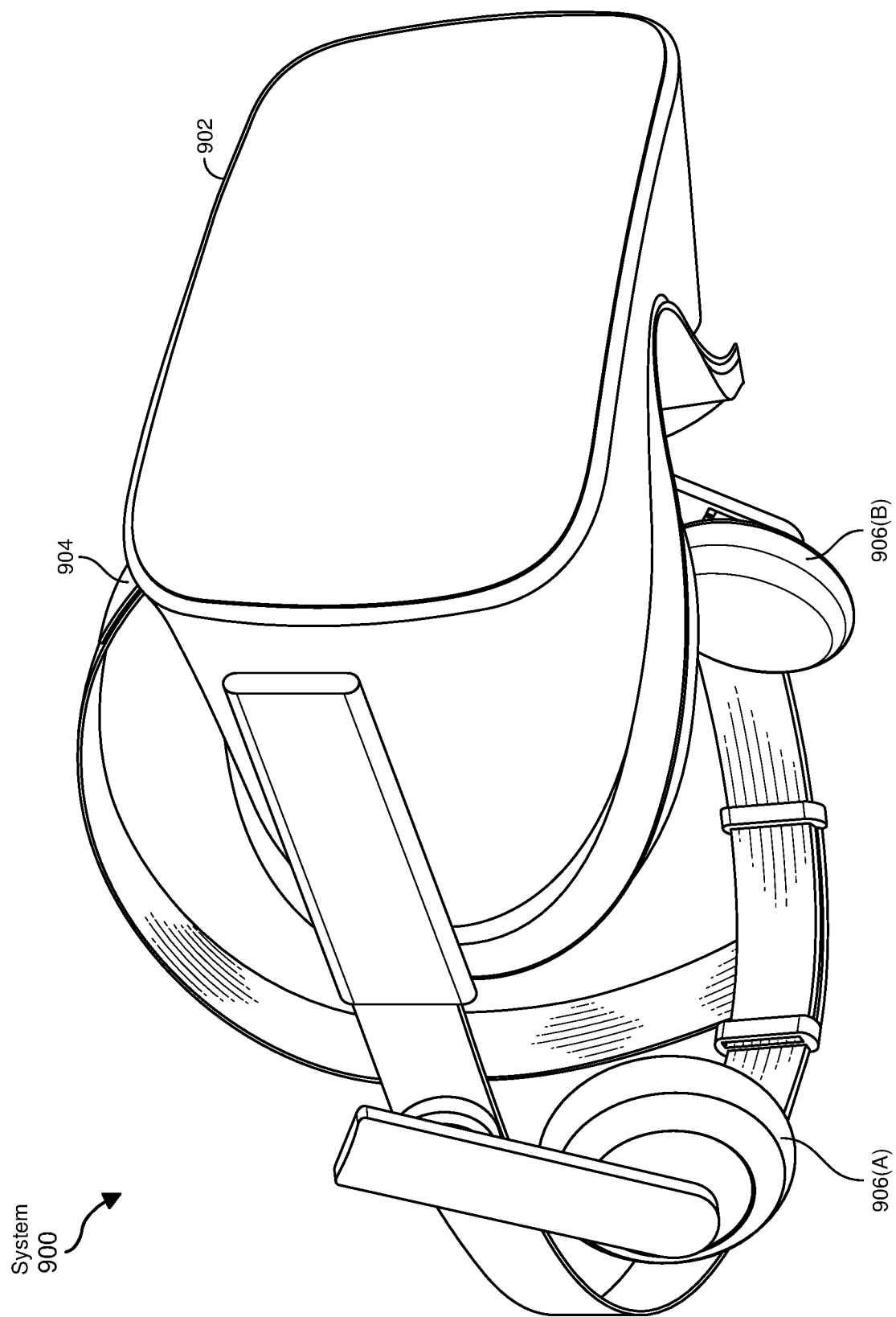
FIG. 9 is a diagram of an example of a virtual-reality headset in which the strap-adjustment mechanisms disclosed herein may be implemented.

The following discussion provides, with reference to FIGS. 1A-1H, a general overview of a dual-adjuster mechanism. The following discussion will also provide, with reference to FIGS. 2-4, detailed descriptions of strap-adjustment mechanisms coupled to and used with artificial-reality displays. The disclosure corresponding to FIG. 5A and FIG. 5B presents before and after perspectives of a user adjusting a strap mechanism for a head-mounted display. The discussion corresponding to the FIG. 6 provides an overview of a method for manufacturing a strap-adjustment mechanism according to embodiments presented herein, and the discussion corresponding to FIGS. 7-9 provide a detailed overview of systems with which the strap adjustment mechanisms described herein may be used.

Turning to FIG. 1A, a strap adjustment mechanism 100 may include a strap 110 and a strap adjuster 120. As shown, a proximal portion 112 of strap 110 may be coupled to a back area of strap adjuster 120. Strap adjuster 120 may also include an opening 122 through which a second strap may pass. A width 114 of strap 110 may be narrower than a width 124 of strap adjuster 120. This may enable a user to grip a top and bottom of strap adjuster 120 without also gripping a strap passing through opening 122.

Figure 1B:
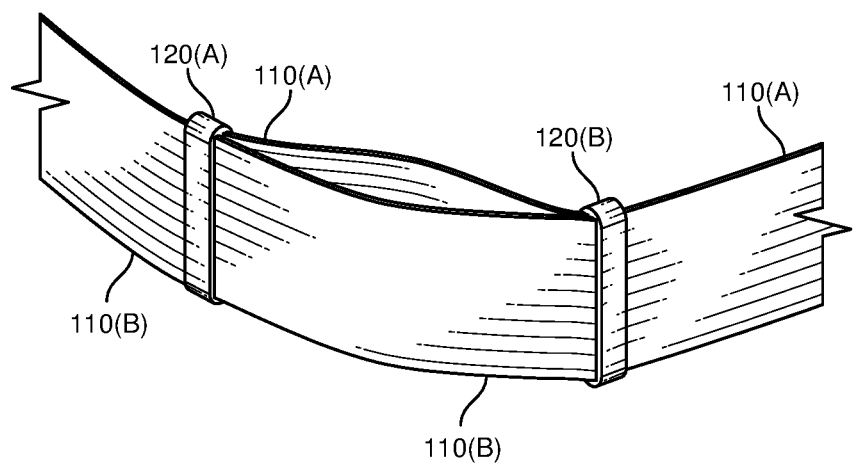
FIG. 1B is a diagram of a pair of exemplary strap adjusters that are cross-coupled to two straps.

FIG. 1B shows two strap adjusters 120(A) and 120(B) that are adjustably coupled to two straps, strap 110(A) and strap 110(B). As shown in FIG. 1B, strap 110(B) may pass through an opening in strap adjuster 120(A) and may be coupled to a back portion of strap adjuster 120(B). Similarly, strap 110(A) may pass through an opening in strap adjuster 120(B) and may be coupled to strap adjuster 120(A). In other words, a proximal portion of strap 110(A) may be coupled to strap adjuster 120(A) and may be threaded through strap adjuster 120(B). Similarly, a proximal portion of strap 110(B) may be coupled to strap adjuster 120(B) and threaded through strap adjuster 120(A).

While FIG. 1B shows an exemplary configuration of a strap-adjustment mechanism, the strap-adjustment mechanisms disclosed herein may be configured in a variety of other ways. For example, strap adjusters 120(A) and 120(B) may be any suitable shape or size. Similarly, openings in strap adjusters 120(A) and 120(B) may be any suitable shape or size and may be positioned in any suitable orientation within strap adjusters 120(A) and 120(B). Furthermore, while FIG. 1B shows strap adjusters 120(A) and 120(B) as being single-threaded strap adjusters (e.g., strap adjusters with a single opening), the strap adjustment mechanisms disclosed herein may include any suitable number of openings.

Figure 1C:
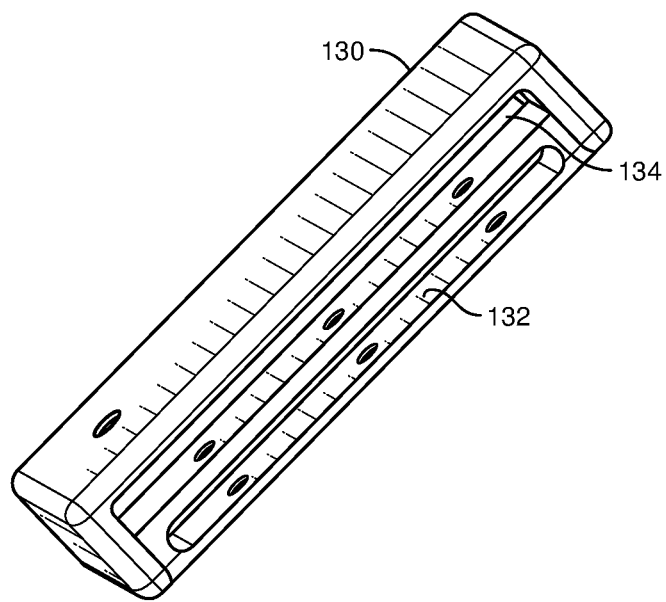
FIG. 1C is a diagram of another exemplary strap adjuster.
Figure 1D:
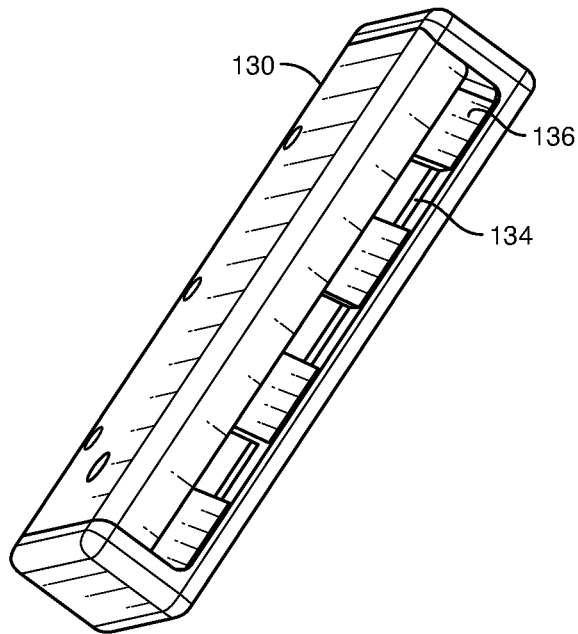
FIG. 1D is a diagram of another view of the exemplary strap adjuster in FIG. 1C.
Figure 1E:
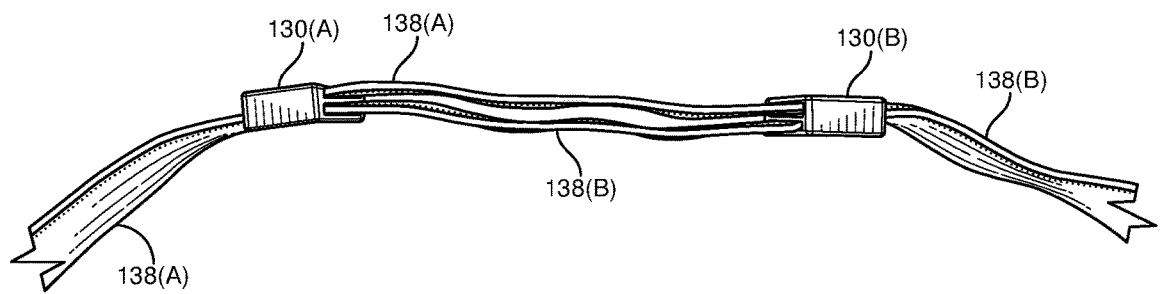
FIG. 1E is a diagram of a pair of exemplary strap adjusters that are cross-coupled to two straps.

FIGS. 1C, 1D, and 1E show another exemplary configuration of a strap adjuster 130. As shown, strap adjuster 130 may include an opening 132 dimensioned to secure the end of a strap to strap adjuster 130. Strap adjuster 130 may also include an opening 134, which may be dimensioned to allow a strap to pass through strap adjuster 130 from a front side to a back side. Opening 134 may include one or more protuberances 136 that may create additional friction against a strap to help keep the strap in position after being adjusted. Protuberances 136 may be of any suitable size, shape, or number. As shown in FIG. 1E, a strap 138(A) may pass through an opening in a first instance of strap adjuster 130 (i.e., a strap adjuster 130(A)) and may be coupled to a back portion of a second instance of strap adjuster 130 (i.e., a strap adjuster 130(B)). Similarly, a strap 138(B) may pass through an opening in strap adjuster 130(B) and may be coupled to strap adjuster 130(A). In other words, a proximal portion of strap 138(A) may be coupled to strap adjuster 130(B) and may be threaded through strap adjuster 130(A). Similarly, a proximal portion of strap 138(B) may be coupled to strap adjuster 130(A) and threaded through strap adjuster 130(B).

Figure 1F:
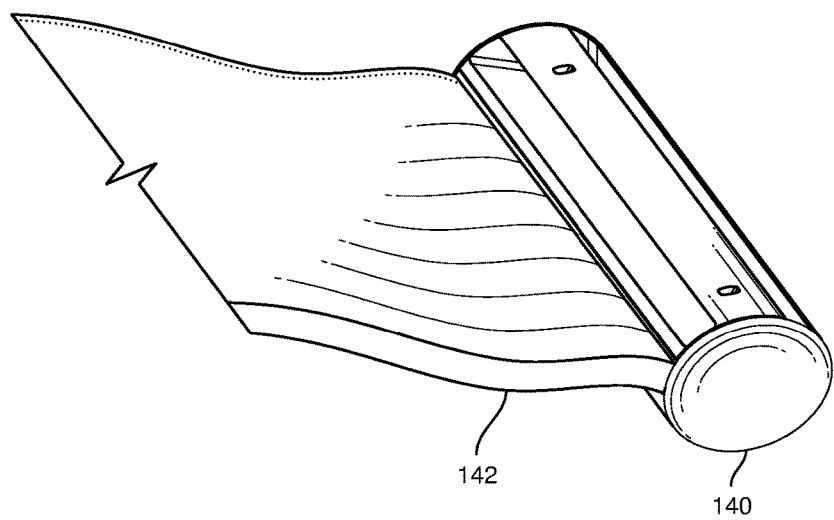
FIG. 1F is a diagram of a left-handed strap adjuster.
Figure 1G:
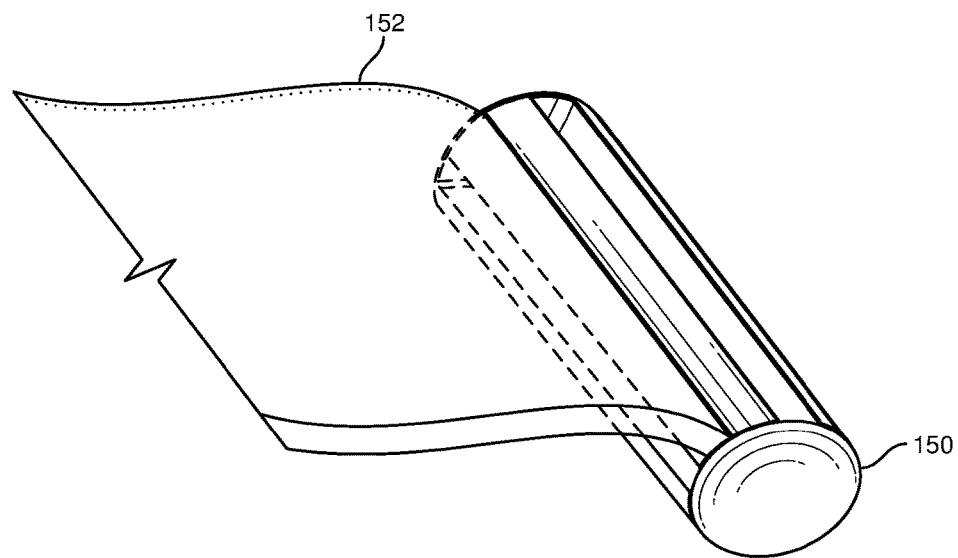
FIG. 1G is a diagram of a right-handed strap adjuster.
Figure 1H:
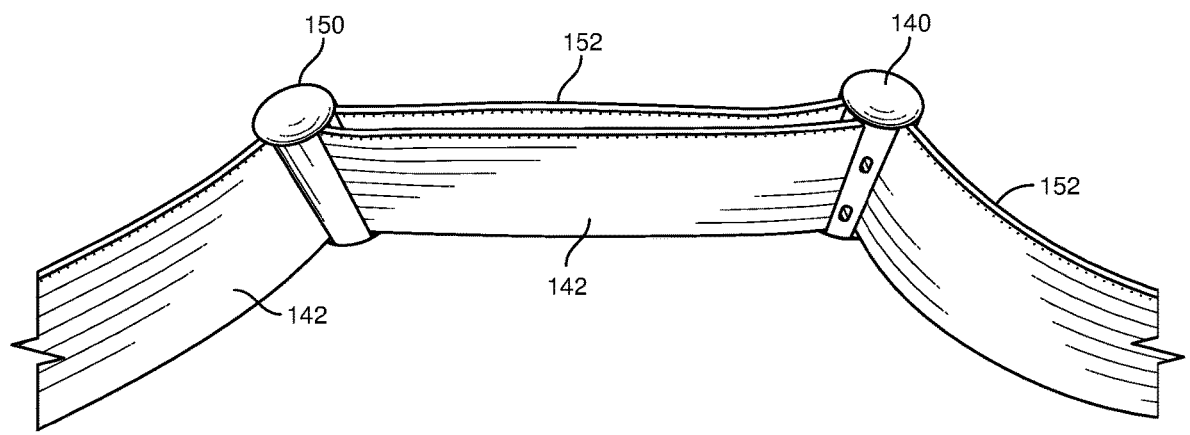
FIG. 1H is a diagram of left- and right-handed strap adjusters that are cross-coupled to two straps.

FIGS. 1F, 1G, and 1H show straps adjusters with left- and right-handed configurations. As shown in FIG. 1F, a strap adjuster 140 may be attached to a strap 142 at a region 144 of strap adjuster 140. Strap adjuster 140 may also include an opening 146, which may be angled and/or curved and dimensioned to allow a strap to pass through strap adjuster 140. The angle and/or curve of opening 146 may, when strap adjuster 140 is used to hold a head-mounted display against a user's head, create additional friction against a strap to help keep the strap in position after being adjusted.

FIG. 1G shows a strap adjuster 150, which may be configured to be used in conjunction with strap adjuster 140. As shown, strap adjuster 150 may be attached to a strap 152 at a region 154 of strap adjuster 150. Strap adjuster 150 may also include an opening 156, which may be angled and/or curved and dimensioned to allow a strap to pass through strap adjuster 150. The angle and/or curve of opening 156 may, when strap adjuster 150 is used to hold a head-mounted display against a user's head, create additional friction against a strap to help keep the strap in position after being adjusted. In other words, strap adjusters 140 and 150 may be dimensioned such that an exit angle of a strap through adjusters 140 and 150 may result in a camming motion of strap adjusters 140 and 150 when straps passing through strap adjusters 140 and 150 are under tension and/or released from tension. This camming function may allow straps to more easily pass through adjusters 140 and 150 when the straps are not under tension and may cause strap adjusters 140 and 150 to resist movement of the strap when the straps are under tension (i.e., being used to hold a head-mounted display against a user's head). As shown in FIG. 1G, strap 152 may be coupled to strap adjuster 150 in between the two sides of opening 156, in contrast with how strap 142 is coupled to strap adjuster 140 (i.e., outside of both sides of opening 146).

As shown in FIG. 1H, strap 142 may pass through an opening in a strap adjuster 150 and may be connected to strap adjuster 140. Similarly, strap 152 may pass through strap adjuster 140 and may be connected to strap adjuster 150. In other words, a proximal portion of strap 142 may be coupled to strap adjuster 140 and may be threaded through strap adjuster 150. Similarly, a proximal portion of strap 152 may be coupled to strap adjuster 150 and threaded through strap adjuster 140.

Strap adjusters 140 and/or 150 may include a friction surface, which may include one or more protrusions that create friction against a strap, within openings 146 and/or 156, respectively. These friction surfaces may be partially or fully enclosed within strap adjusters 140 and 150 when straps 142 and 152 are passed through openings 146 and 156. Such interior friction surfaces may provide for a clean aesthetic while also providing resistance against strap movement. Interior friction surfaces may also decrease the likelihood that strap adjusters 140 and 150 will catch hair in openings 146 and 156 as straps 142 and 152 pass through openings 146 and 156.

The straps and strap adjusters disclosed herein be made of any suitable material and manufactured in any suitable manner. For example, straps 110(A), 110(B), 138(A), 138(B), 142, and/or 152 may be made from fabric, nylon, polyester, etc. In some embodiments, straps 110(A), 110(B), 138(A), 138(B), 142, and/or 152 may be made from an elastic material, and in other embodiments straps 110(A), 110(B), 138(A), 138(B), 142, and/or 152 may be made from an inelastic material. Similarly, strap adjusters 120(A), 120(B), 130(A), 130(B), 140, and/or 150 may be made from rigid, semi-rigid and/or flexible materials. For example, strap adjusters 120(A), 120(B), 130(A), 130(B), 140, and/or 150 may be made from plastic, metal, etc. Furthermore, one or more of strap adjusters 120(A), 120(B), 130(A), 130(B), 140, and/or 150 may be manufactured with two or more snap-together portions (e.g., two halves that snap together around the end of a strap), with smooth inward-facing sides for user comfort, and/or in any other suitable manner to provide any other features discussed herein or shown in the drawings. Alternatively, strap adjusters may be manufactured and/or molded as a single part.

In some embodiments, straps may be insert molded in strap adjusters. For example, strap 142 may be insert-molded into strap adjuster 140 and/or strap 152 may be insert molded into strap adjuster 150. Assembling straps and strap adjusters in this manner may omit the need to double a strap around a portion of an adjuster and sew the strap to itself. Insert molding straps into strap adjusters may provide a variety of advantages, such as a cleaner aesthetic and a less bulky adjustment mechanism, which may be particularly useful for "lay back" VR when a user rests their head against a chair or recliner with a headset donned (which may result in strap adjusters being pinned between the user's head and the chair or recliner).

In addition to or instead of insert-molding a strap to strap adjuster, a strap may be attached to a strap adjuster using glue and/or any other suitable adhesive. Such an assembly may provide advantages similar to those of insert molding a strap to a strap adjuster and may also eliminate the need for holes in the straps adjusters that may be needed for an insert molding process.

Figure 2:
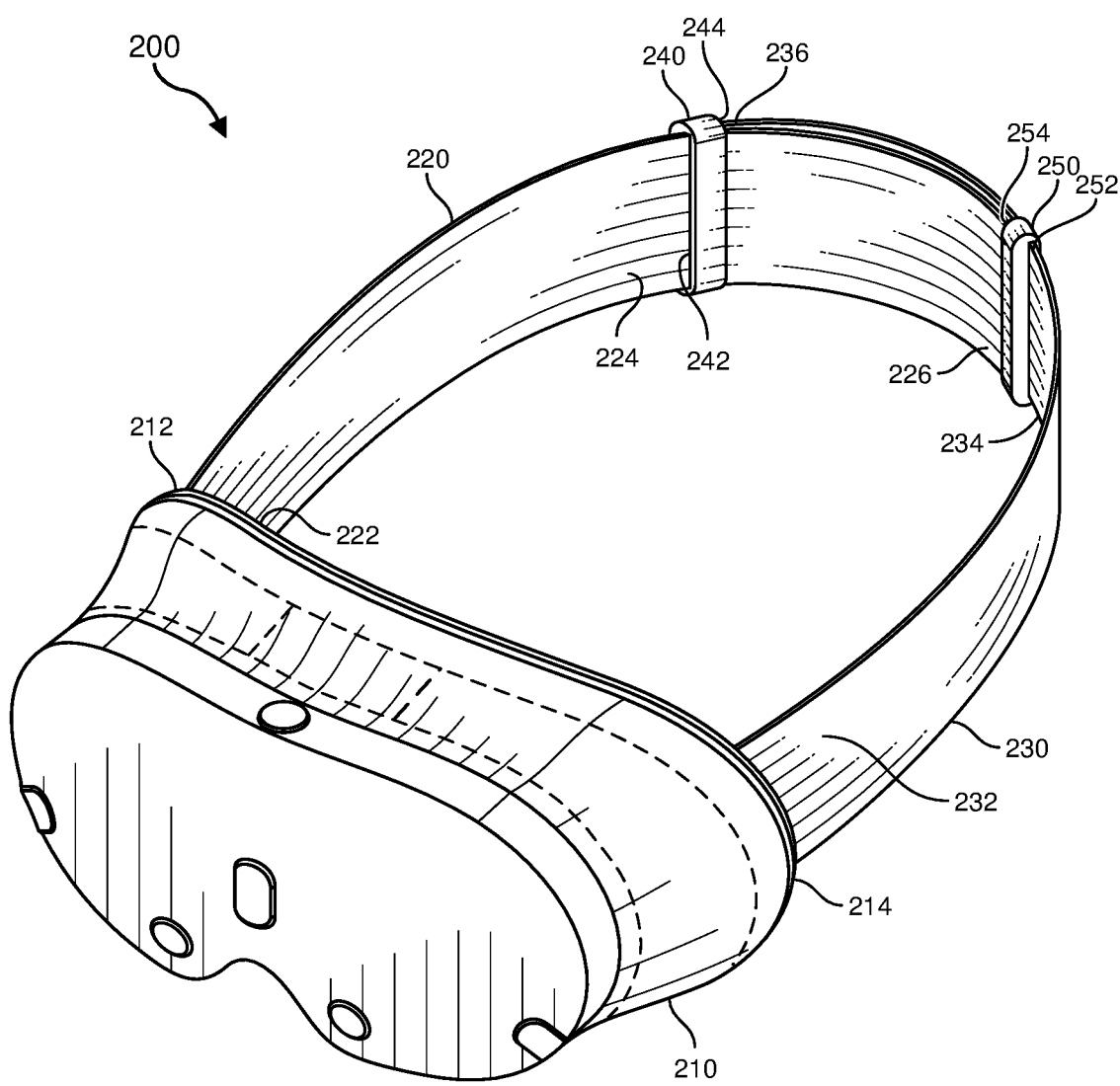
FIG. 2 is a diagram of an artificial-reality headset coupled to the strap adjustment mechanism shown in FIG. 1B.

The strap adjustment mechanisms disclosed herein may be used with various systems and devices. As noted, in some embodiments, the strap adjustment mechanisms of this disclosure may be used with artificial-reality headsets, as shown in FIG. 2. System 200 of FIG. 2 may include an artificial-reality headset 210 to which straps 220 and 230 are coupled. Artificial-reality headset 210 generally represents any type or form of virtual and/or augmented-reality headset, such as augmented-reality system 800 in FIG. 8 and/or virtual reality system 900 in FIG. 9.

FIG. 2 shows that a distal portion 222 of strap 220 may be coupled to a right side 212 of artificial-reality headset 210. In addition, a distal portion 232 of strap 230 may be coupled to a left side 214 of artificial-reality headset 210. A middle portion 224 of strap 220 may pass through an opening 242 in the front of a strap adjuster 240, and a proximal portion 226 of strap 220 may be coupled to a front portion 254 of strap adjuster 250. A middle portion 234 of strap 230 may pass through an opening 252 in the back of a strap adjuster 250, and a proximal portion 236 of strap 230 may be coupled to a back portion 244 of strap adjuster 240. Thus, strap 220 may be threaded through strap adjuster 240 in front of (or under) a portion 244 of strap adjuster 240 where strap 230 is coupled to strap adjuster 240, and strap 230 may be threaded through strap adjuster 250 behind (or on top of) an area of front portion 254 of strap adjuster 250 to which strap 220 is coupled.

Openings 242 and 252 in strap adjusters 240 and 250, respectively, may be dimensioned in a variety of ways. For example, opening 242 may be have similar dimensions to, or may be somewhat or slightly smaller or larger than, strap 220 such that strap 220 may, when pulled, slide through opening 242. Opening 242 may also be dimensioned to provide resistance against movement of strap 220 through opening 242. Such resistance may be created in one or more of a variety of ways. In some embodiments, the resistance may be created by an amount of surface area of opening 242 that makes contact with strap 220, a dimension of opening 242 being smaller than a dimension of strap 220, an angle of opening 242 being slanted relative to a direction of movement of strap 220, one or more surface features (e.g., ridges) of opening 242 being configure in a manner that provides traction, etc. Similarly, opening 252 may be have similar dimensions to, or may be somewhat or slightly smaller or larger than, strap 230 such that strap 230 may, when pulled, slide through opening 252. Opening 252 may also be dimensioned to provide resistance against movement of strap 230 through opening 252. Such resistance may be created in one or more of a variety of ways. In some embodiments, the resistance may be created by an amount of surface area of opening 252 that makes contact with strap 230, a dimension of opening 252 being smaller than a dimension of strap 230, an angle of opening 252 being slanted relative to a direction of movement of strap 230, one or more surface features (e.g., ridges) of opening 252 being configure in a manner that provides traction, etc.

Straps 220 and 230 may be attached to artificial-reality headset 210 in any suitable manner. For example, either or both of straps 220 and 230 may be directly attached to artificial-reality headset 210. Either or both of straps 220 and 230 may also be indirectly attached to artificial-reality headset 210 (e.g., via a pivot or other rotating mechanism that enables straps 220 and 230 to rotate relative to headset 210). In some embodiments, either or both of straps 220 and 230 may be directly attached to a rigid frame of artificial-reality headset 210. Alternatively, either or both of straps 220 and 230 may be attached, either directly or indirectly, to a flexible facial interface of artificial-reality headset 210, as shown in FIGS. 3 and 4.

Figure 3:
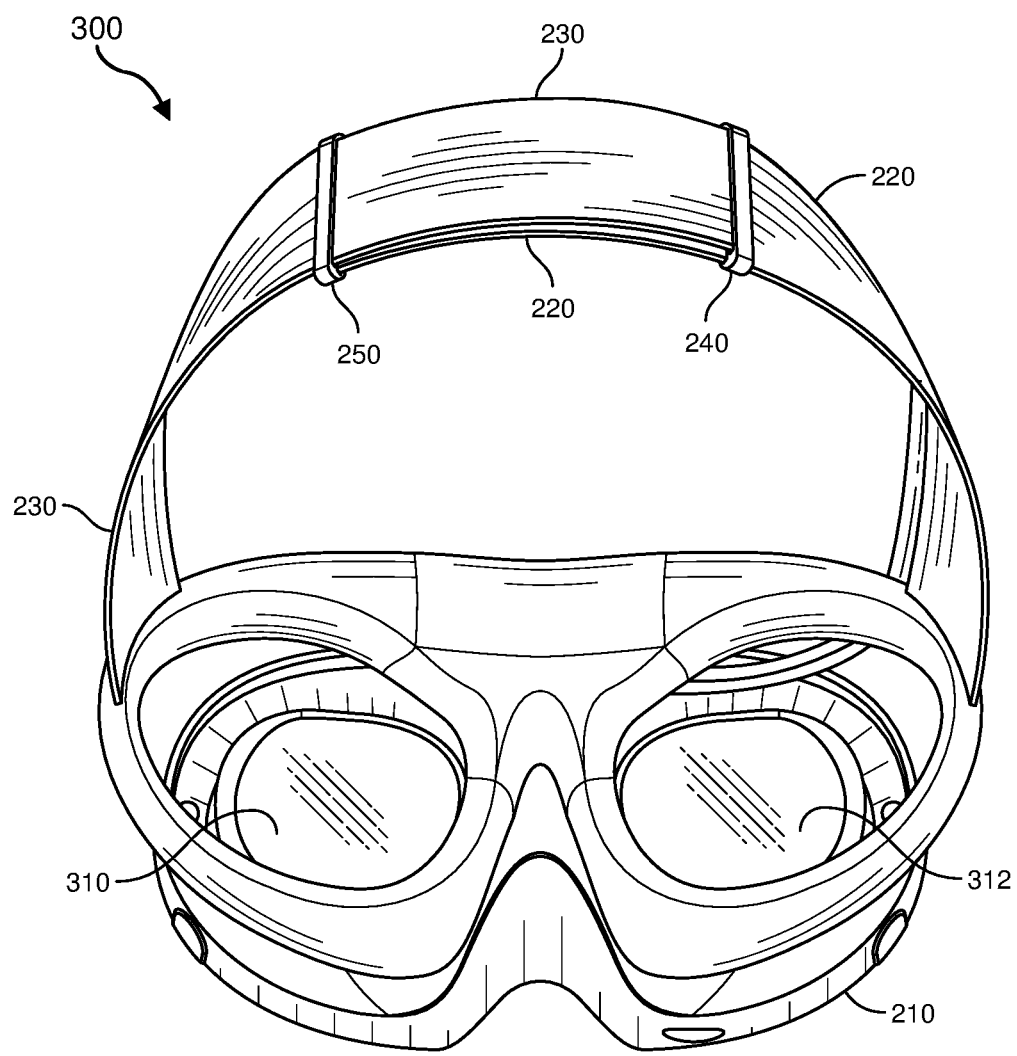
FIG. 3 is a diagram of another perspective of the artificial-reality headset and the strap adjustment mechanism shown in FIG. 2.
Figure 4:
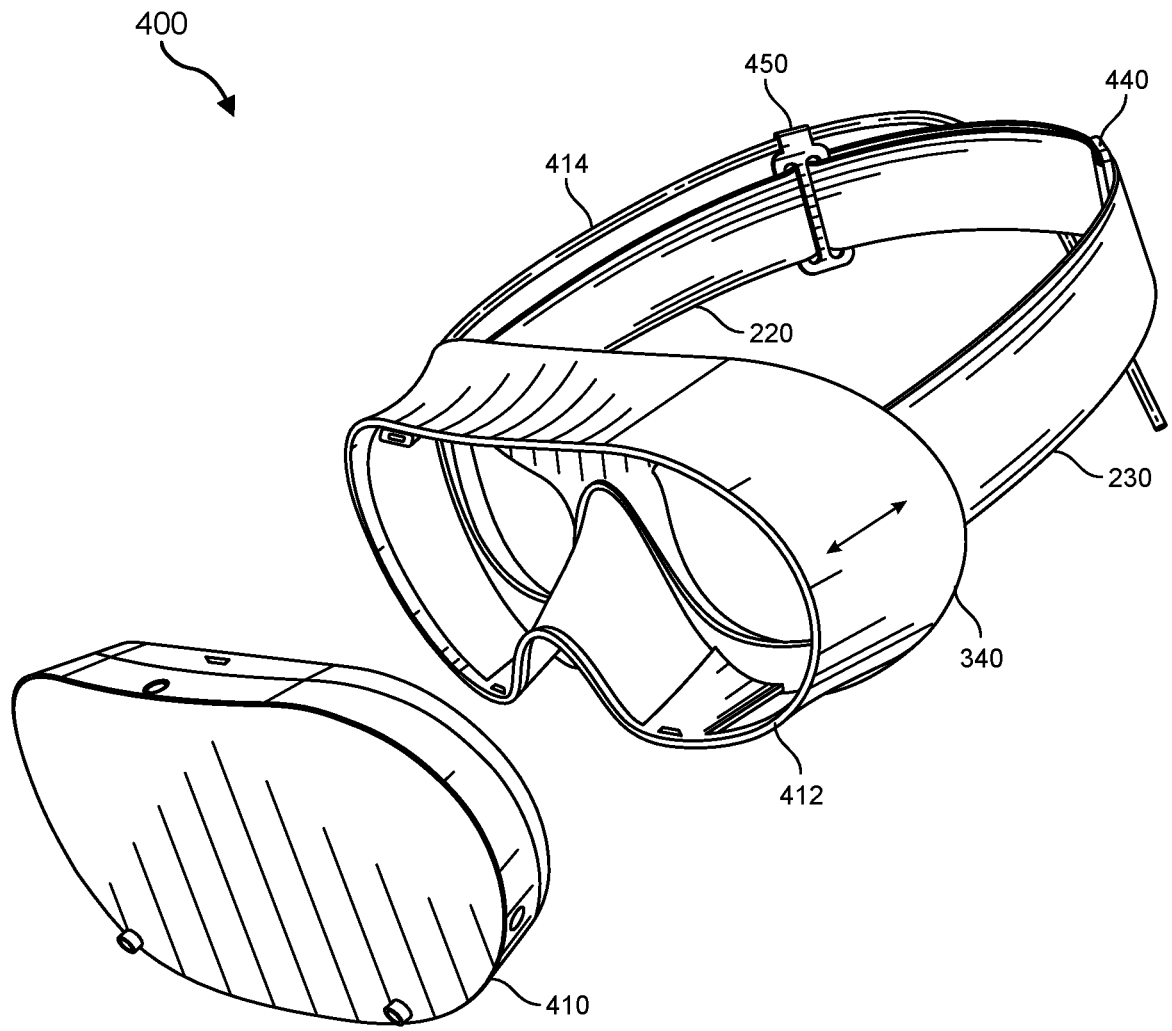
FIG. 4 is a partially-exploded view of an artificial-reality headset with an variation of the strap adjusters shown in FIGS. 1-3.

FIG. 3 and system 300 is a bottom back perspective view of system 200 and FIG. 4 and system 400 is a perspective view of system 200 with artificial-reality headset 210 in a partially disassembled state. Referring to FIGS. 3 and 4, artificial-reality headset 210 may include one or more displays 310 and 312. Artificial-reality headset 210 may also include a facial interface assembly 412 for supporting display for resting artificial-reality headset 210 against a user's face.

In some embodiments, display 310 may be removable and replaceable relative to facial interface assembly 412, as shown in FIG. 4. For example, facial interface assembly 412 may be configured to interchangeably support different displays, or to remove and replace display 310 for cleaning display 310 and/or facial interface assembly 412, for electrically charging display 310, or for other maintenance to display 310.

Facial interface assembly 412 may include a rigid support frame element 410 that is shaped and configured to physically support display 310 in front of a user's eyes when facial interface assembly 412 is worn by the user. Thus, the shape of rigid support frame element 410 may be complementary to a shape of display 310. Rigid support frame element 410 may include one or more display engagement elements such as magnets, notches, bumps, latches, clips, etc. for removably coupling display 310 to rigid support frame element 410. In some examples, an electrical connector may be disposed on rigid support frame element 410, such as to connect display 310 to an electrical cable 414. As shown in FIG. 4, a strap adjuster 450 may include a guide or hook for routing electrical cable 414 behind a user's head. In additional embodiments, display 310 may be removably coupled to rigid support frame element 410 without use of the engagement elements. For example, display 310 may snugly fit within rigid support frame element 410 and may be held in place by friction.

Facial interface assembly 412 may also include a flexible facial interface frame element 340 that is configured to flex to conform to the user's facial features when artificial-reality headset 210 is worn by the user. A facial interface padding may be disposed on an inner (i.e., toward the user's face when worn) surface of the flexible facial interface frame element to provide a comfortable fit against the user's face. The facial interface padding may include, for example, a closed cell foam or an open cell foam, which may or may not be covered by a fabric material. A frame body of facial interface assembly may include both rigid support frame element 410 and flexible facial interface frame element 340.

At least a portion (e.g., an outer periphery, a nasal bridge portion, etc.) of the flexible facial interface frame element may be flexible in a forward and backward direction A (relative to a user wearing artificial-reality headset 210) to flex and conform to the user's facial size and shape when artificial-reality headset 210 is worn by the user. In some examples, the terms "flexible" and "rigid" may be used in a relative sense. For example, the flexible facial interface frame element may be relatively more flexible than rigid support frame element 410 in the forward and backward direction A, even though both of these elements may exhibit some level of flexibility. For example, both the flexible facial interface frame element and rigid support frame element 410 may be formed of the same material. By way of example and not limitation, the flexible facial interface frame element and rigid support frame element 410 may be formed of a polymer material, a metal material, a fiber-matrix composite material, or a combination thereof. In one non-limiting example, the frame body, including the flexible facial interface frame element and the rigid support frame element, may be formed of a thermoplastic polymer material, such as nylon.

The relative flexibility of the flexible facial interface frame element may be accomplished by the material properties and/or configuration of the material forming the flexible facial interface frame element. For example, a thickness of the flexible facial interface frame element in the forward and backward direction A (relative to a user wearing artificial-reality headset 210) may be sufficiently small to enable flexing in the forward and backward direction A with an application of a relatively small force (e.g., a force applied by the straps 220 and 230 to comfortably hold artificial-reality headset 210 on the user's head). Due to its flexibility in at least the forward and backward direction A, the flexible facial interface frame element may be customizable and adaptable to a variety of different face shapes, features, and/or sizes. In additional examples, the material of the flexible facial interface frame element may be selected for its flexibility. For example, the flexible facial interface frame element may be or include a foam material, which may or may not be covered with a flexible coating, such as a silicone or rubber coating.

The relative rigidity of rigid support frame element 410 may be accomplished by the material properties and/or configuration of the material forming the rigid support frame element. For example, rigid support frame element 410 may be or include a lip having a width in a generally forward and backward direction A (relative to a user wearing artificial-reality headset 210) that is sufficient to reduce flexibility of at least a portion (e.g., an outer periphery) of rigid support frame element 410 in the forward and backward direction A. In addition, coupling display 310 to rigid support frame element 410 may further inhibit flexing of rigid support frame element 410 in the forward and backward direction A.

Rigid support frame element 410 may be coupled to (e.g., attached to, adhered to, integrally formed with, or fastened to, etc.) and physically supported by the flexible facial interface frame element. At least one central support element may couple rigid support frame element 410 to the flexible facial interface frame element. The at least one central support element may include, for example, an upper central support element extending between and coupling an upper portion of rigid support frame element 410 to an upper portion of the flexible facial interface frame element. The upper central support element may be positioned to be over the user's nose when artificial-reality headset 210 is worn by the user. The upper central support element may be sized and configured to physically support at least a portion of rigid support frame element 410 and display 310. The upper central support element may also provide a standoff between rigid support frame element 410 and the flexible facial interface frame element, such as to provide space for components of display 310, to provide relief for the user's nose, etc.

A combination of the adjustment mechanisms disclosed herein and a headset with a flexible facial interface frame element may provide both comfort and ease-of use to a user. For example, flexibility of a facial interface may provide a first level of adjustability with a strap-adjustment mechanism, such as a mechanism provided by strap adjusters 440 and 450, providing a second level. Strap adjustment mechanisms 440 and 450 may, as shown in FIG. 4, have two openings through which straps 420 and 430 pass. A double-threaded configuration may provide greater resistance to movement of the straps than a single-threaded implementation. In this example, strap 230 may be threaded through two openings in strap adjuster 440 and coupled to a side of strap adjuster 450. Strap 220 may be threaded through two openings in strap adjuster 450 and attached to a side of strap adjuster 440. As shown, straps 420 and 430 may be threaded in opposite manners (e.g., one in an over-under-over threading and the other in an under-over-under threading) to enable the straps to overlap.

FIGS. 5A and 5B show how a user 500 may adjust a strap adjustment-mechanism to provide a better fit. In FIG. 5A, user 500 may grasp strap adjuster 240 with a right hand 520 and strap adjuster 250 with a left hand 510. By pulling strap adjusters 240 and 250 apart, user 500 may tighten straps 220 and 230 around the head to provide a more secure and/or more comfortable fit of artificial-reality headset 210. Conversely, by pushing strap adjusters 240 and 250 closer together, user 500 may loosen straps 220 and 230. Thus, as illustrated in FIGS. 5A and 5B, the openings in strap adjusters 240 and 250 may be dimensioned to enable user 500 to adjust a position of the strap adjustment mechanism while artificial-reality headset 210 is being held against a face of the user by first and second straps 220 and 230. Furthermore, the openings in strap adjusters 240 and 250 may be dimensioned to maintain a position of the strap adjustment mechanism while the first and second straps holds the artificial-reality headset against a face of a user.

In some embodiments, strap adjuster 240 and/or strap adjuster 250 may be configured to make top and/or bottom portions easier to for a user to grip to enable the user to make adjustments. For example, strap adjusters 240 and 250 may be designed with ridges or other protrusions on top and bottom sections to make them easier to grip. As another example, strap adjusters 240 and 250 may include a different material on the top and/or bottom to make them easier to grip.

FIG. 6 shows an exemplary method for forming a strap-adjustment mechanism. At step 610, a first strap may be threaded through an opening in a first strap adjuster, and at step 620, the first strap may be coupled to a second strap adjuster. In some embodiments, the first strap may first be coupled to the strap adjuster and may then be threaded through the opening in the first strap adjuster. The first strap may be coupled to the second strap adjuster in any suitable manner. For example, the first strap may be coupled to the first strap adjuster with an adhesive, with an attachment mechanism, via a thermal bonding process, etc.

At step 630, a second strap may be threaded through an opening in the second strap adjuster, and at step 640, the second strap may be coupled to the first strap adjuster. In some embodiments, the second strap may first be coupled to the strap adjuster and may then be threaded through the opening in the second strap adjuster. The second strap may be coupled to the first strap adjuster in any suitable manner.

For example, the second strap may be coupled to the first strap adjuster with an adhesive, with an attachment mechanism, via a thermal bonding process, etc.

Method 600 any also include a variety of additional steps. For example, method 600 may include coupling a distal portion of the first strap to a right side of an artificial-reality headset and coupling a distal portion of the second strap to a left side of the artificial-reality headset. The distal portions of the first and second straps may be coupled to the artificial-reality headset in any suitable manner. For example, the distal portions of the first and second straps may be coupled to the artificial-reality headset directly via an adhesive, a bonding process, a fastener, etc. As another example, the distal portions of the first and second straps may be coupled to the artificial-reality headset indirectly (e.g., via a pivot mechanism, a mechanical linkage, a band, another strap, etc.).

Embodiments of the instant disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 700 in FIG. 7. Other artificial reality systems may include a NED that also provides visibility into the real world (e.g., augmented-reality system 800 in FIG. 8) or that visually immerses a user in an artificial reality (e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 7, augmented-reality system 700 generally represents a wearable device dimensioned to fit about a body part (e.g., a head) of a user. As shown in FIG. 7, system 700 may include a frame 702 and a camera assembly 704 that is coupled to frame 702 and configured to gather information about a local environment by observing the local environment. Augmented-reality system 700 may also include one or more audio devices, such as output audio transducers 708(A) and 708(B) and input audio transducers 710. Output audio transducers 708(A) and 708(B) may provide audio feedback and/or content to a user, and input audio transducers 710 may capture audio in a user's environment.

As shown, augmented-reality system 700 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 700 may not include a NED, augmented-reality system 700 may include other types of screens or visual feedback devices (e.g., a display screen integrated into a side of frame 702).

Augmented-reality system 700 may also include a strap-adjustment mechanism with a strap 720 that is coupled to a right side of frame 702, threaded through an opening in a strap adjuster 740, and coupled to a strap adjuster 750. The strap-adjustment mechanism may also include a strap 730 that is coupled to a left side of frame 702, threaded through an opening in strap adjuster 750, and coupled to strap adjuster 740. Strap adjusters 740 and 750 may be pulled apart or pushed together to tighten or loosen a fit of augmented-reality system 700 about a user's head.

The embodiments discussed in this disclosure may also be implemented in augmented-reality systems that include one or more NEDs. For example, as shown in FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. Frame 810 may be coupled to a left strap 870 and a right strap 880. Straps 870 and 880 may be coupled via strap adjusters 855 and 860, which may be pulled apart to loosen straps 870 and 880 or pushed together to tighten straps 870 and 880. While augmented-reality system 800 includes two displays, embodiments of this disclosure may be implemented in Augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may include a position sensor, an inertial measurement unit (IMU), a depth camera assembly, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

Augmented-reality system 800 may also include a microphone array with a plurality of acoustic transducers 820(A)-820(J), referred to collectively as acoustic transducers 820. Acoustic transducers 820 may be transducers that detect air pressure variations induced by sound waves. Each acoustic transducer 820 may be configured to detect sound and convert the detected sound into an electronic format (e.g., an analog or digital format). The microphone array in FIG. 2 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(F) may be used as output transducers (e.g., speakers). For example, acoustic transducers 820(A) and/or 820(B) may be earbuds or any other suitable type of headphone or speaker. As shown in FIG. 8, acoustic transducer 820(A) may be coupled to strap 870 and acoustic transducer 820(B) may be coupled to strap 880. In this example, straps 870 and 880 may also include wires or traces to carry audio signals from transducers 820(A) and 820(B) to a controller 850.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by the controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer, or some combination thereof.

Acoustic transducers 820(A) and 820(B) may be positioned on different parts of the user's ear, such as behind the pinna or within the auricle or fossa. Or, there may be additional acoustic transducers on or surrounding the ear in addition to acoustic transducers 820 inside the ear canal. Having an acoustic transducer positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection, and in other embodiments, acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810, strap 870, and strap 880 may be positioned along the length of the temples, across the bridge, above or below display devices 815(A) and 815(B), or some combination thereof. Acoustic transducers 820 may be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

Augmented-reality system 800 may further include or be connected to an external device (e.g., a paired device), such as neckband 805. As shown, neckband 805 may be coupled to eyewear device 802 via one or more connectors. The connectors may be wired or wireless connectors and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof. Furthermore, neckband 805 generally represents any type or form of paired device. Thus, the following discussion of neckband 805 may also apply to various other paired devices, such as smart watches, smart phones, wrist bands, other wearable devices, hand-held controllers, tablet computers, laptop computers, etc.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 805 may be communicatively coupled with eyewear device 802 and/or to other devices. The other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a DoA estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial reality experience.

Band 904 generally represents any type or form of strap for holding a headset against a user's face. Band 904 may include three segments: (1) an overhead strap 920, a left strap 922, and a right strap 924. Band 904 may be tightened via strap adjusters 912 and 914, which may be coupled to right strap 924 and left strap 922. A distal portion of right strap 924 may be coupled to the right side of rigid body 902 via a mechanical linkage 910 that enables the distal portion of right strap 924 to rotate relative to the rigid body 902. A distal portion of left strap 922 may be coupled to the left side of the rigid body 902 via another mechanical linkage (not shown) that enables the distal portion of the left strap to rotate relative to rigid body 902.

Artificial reality systems may include a variety of types of visual feedback mechanisms. For example, display devices in augmented-reality system 800 and/or virtual-reality system 900 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 700, Augmented-reality system 800, and/or virtual-reality system 900 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 7 and 9, output audio transducers 708(A), 708(B), 906(A), and 906(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 710 may include condenser microphones, dynamic microphones, ribbon microphones, and/or any other type or form of input transducer. In some embodiments, a single transducer may be used for both audio input and audio output.

While not shown in FIGS. 7-9, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Example 1: An apparatus may comprise a first strap and a second strap positioned to at least partially overlap the first strap. The apparatus may also comprise a first strap adjuster, wherein a proximal portion of the first strap is coupled to the first strap adjuster and the second strap is threaded through the first strap adjuster. The apparatus may further comprise a second strap adjuster, wherein a proximal portion of the second strap is coupled to the second strap adjuster and the first strap is threaded through the second strap adjuster.

Example 2: The apparatus of example 1, wherein a distal portion of the first strap is coupled to a right side of a head-mounted display and a distal portion of the second strap is coupled to a left side of a head-mounted display.

Example 3: The apparatus of example 2, wherein the head-mounted display comprises a virtual-reality headset.

Example 4: The apparatus of examples 2 or 3, wherein at least one of (1) the distal portion of the first strap is coupled to the right side of the head-mounted display via a first mechanical linkage that enables the distal portion of the first strap to rotate relative to the head-mounted display, or (2) the distal portion of the second strap is coupled to the left side of the head-mounted display via a second mechanical linkage that enables the distal portion of the second strap to rotate relative to the head-mounted display.

Example 5: The apparatus of any of examples 1-4, wherein at least one of (1) a width of the first strap adjuster is larger than a width of a portion of the second strap that is threaded through the first strap adjuster, or (2) a width of the second strap adjuster is larger than a width of a portion of the first strap that is threaded through the second strap adjuster.

Example 6: The apparatus of example 5, wherein at least one of (1) top and bottom portions of the first strap adjuster comprise grips that enable a user to move the first strap adjuster along a length of the second strap, or (2) top and bottom portions of the second strap adjuster comprise grips that enable a user to move the second strap adjuster along a length of the first strap.

Example 7: The apparatus of any of examples 1-6, wherein at least one of (1) the second strap is threaded through the first strap adjuster via an opening dimensioned to provide resistance to movement of the second strap, or (2) the first strap is threaded through the second strap adjuster via an opening dimensioned to provide resistance to movement of the first strap.

Example 8: The apparatus of any of examples 1-7, wherein the first strap is threaded through the second strap adjuster over an area of the second strap adjuster where the second strap is coupled to the second strap adjuster and the second strap is threaded through the first strap adjuster under an area of the first strap adjuster where the first strap is coupled to the first strap adjuster.

Example 9: The apparatus of any of examples 1-8, wherein the first strap adjuster comprises a first interior friction surface that, when the second strap is threaded through the first strap adjuster, is enclosed by the first strap adjuster, and the second strap adjuster comprises a second interior friction surface that, when the first strap is threaded through the second strap adjuster, is enclosed by the second strap adjuster.

Example 10: The apparatus of any of examples 1-9, wherein at least one of: the first strap adjuster comprises a single-threaded strap adjuster with a single opening through which the second strap is threaded, or the second strap adjuster comprises a single-threaded strap adjuster with a single opening through which the first strap is threaded.

Example 11: The apparatus of any of examples 1-10, wherein at least one of: the first strap is coupled to the first strap adjuster via insert molding or the second strap is coupled to the second strap adjuster via insert molding.

Example 12: The apparatus of any of examples 1-10, wherein at least one of: the first strap is coupled to the first strap adjuster using an adhesive or the second strap is coupled to the second strap adjuster using the adhesive.

Example 13: A system comprising an artificial-reality headset, a first strap comprising a distal portion coupled to the artificial-reality headset, and a second strap that is positioned to at least partially overlap the first strap and that comprises a distal portion coupled to the artificial-reality headset. The system may also comprise a strap adjustment mechanism having (1) a first strap adjuster, wherein a proximal portion of the first strap is coupled to the first strap adjuster and the second strap is threaded through the first strap adjuster, and (2) a second strap adjuster, wherein a proximal portion of the second strap is coupled to the second strap adjuster and the first strap is threaded through the second strap adjuster.

Example 14: The system of examples 13, wherein the second strap is threaded through the first strap adjuster via an opening dimensioned to provide resistance to movement of the second strap and the first strap is threaded through the second strap adjuster via an opening dimensioned to provide resistance to movement of the first strap.

Example 15: The system of example 14, wherein the openings in the first and second strap adjusters are dimensioned to maintain a position of the strap adjustment mechanism while the first and second straps holds the artificial-reality headset against a face of a user.

Example 16: The system of examples 14 or 15, wherein the openings in the first and second strap adjusters are dimensioned to enable a user to adjust a position of the strap adjustment mechanism while the artificial-reality headset is being held against a face of the user by the first and second straps.

Example 17: The system of any of examples 13-16, wherein at least one of (1) the distal portion of first strap is attached directly to the artificial-reality headset or (2) the distal portion of second strap is attached directly to the artificial-reality headset.

Example 18: The system of any of examples 13-17, wherein (1) the artificial-reality headset comprises a rigid support frame element dimensioned to physically support a display of a head-mounted display system in front of eyes of a user when the artificial-reality headset is worn by the user, and (2) the artificial-reality headset comprises a flexible facial interface frame element configured to flex to conform to facial features of the user when the artificial-reality headset is worn by the user, (3) an outer periphery of the flexible facial interface frame element is independently movable relative to an outer periphery of the rigid support frame element, and (4) the distal portions of the first and second straps are coupled to the rigid support frame element.

Example 19: A method of forming a strap-adjustment mechanism, the method comprising (1) threading a proximal portion of a first strap through an opening in a first strap adjuster, (2) coupling the proximal portion of the first strap to a second strap adjuster, (3) threading a proximal portion of a second strap through an opening in the second strap adjuster, and (4) coupling the proximal portion of the second strap to the second strap adjuster.

Example 20: The method of example 19, further comprising (1) coupling a distal portion of the first strap to a right side of an artificial reality headset, and (2) coupling a distal portion of the second strap to a left side of the artificial reality headset.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. An apparatus comprising:
   a first strap, wherein a distal portion of the first strap is coupled to a first side of a head-mounted display via a first mechanical linkage that enables the distal portion of the first strap to rotate relative to the head-mounted display;
   a second strap positioned to at least partially overlap the first strap;
   a first strap adjuster, wherein a proximal portion of the first strap is coupled to the first strap adjuster and the second strap is threaded through the first strap adjuster; and
   a second strap adjuster, wherein a proximal portion of the second strap is coupled to the second strap adjuster and the first strap is threaded through the second strap adjuster.
2. The apparatus of claim 1, wherein:
   the distal portion of the first strap is coupled to a right side of the head-mounted display; and a distal portion of the second strap is coupled to a left side of the head-mounted display.

3. The apparatus of claim 2, wherein the head-mounted display comprises a virtual-reality headset.

4. The apparatus of claim 1, wherein
the distal portion of the second strap is coupled to a second side of the head-mounted display opposite the first side via a second mechanical linkage that enables the distal portion of the second strap to rotate relative to the head-mounted display.

5. The apparatus of claim 1, wherein at least one of:
a width of the first strap adjuster is larger than a width of a portion of the second strap that is threaded through the first strap adjuster; or
a width of the second strap adjuster is larger than a width of a portion of the first strap that is threaded through the second strap adjuster.

6. The apparatus of claim 5, wherein at least one of:
top and bottom portions of the first strap adjuster comprise grips that enable a user to move the first strap adjuster along a length of the second strap; or
top and bottom portions of the second strap adjuster comprise grips that enable a user to move the second strap adjuster along a length of the first strap.

7. The apparatus of claim 1, wherein at least one of:
the second strap is threaded through the first strap adjuster via an opening dimensioned to provide resistance to movement of the second strap; or
the first strap is threaded through the second strap adjuster via an opening dimensioned to provide resistance to movement of the first strap.

8. The apparatus of claim 1, wherein:
the first strap is threaded through the second strap adjuster over an area of the second strap adjuster where the second strap is coupled to the second strap adjuster; and
the second strap is threaded through the first strap adjuster under an area of the first strap adjuster where the first strap is coupled to the first strap adjuster.

9. The apparatus of claim 8, wherein:
the first strap adjuster comprises a first interior friction surface that, when the second strap is threaded through the first strap adjuster, is enclosed by the first strap adjuster; and
the second strap adjuster comprises a second interior friction surface that, when the first strap is threaded through the second strap adjuster, is enclosed by the second strap adjuster.

10. The apparatus of claim 1, wherein at least one of:
the first strap adjuster comprises a single-threaded strap adjuster with a single opening through which the second strap is threaded; or
the second strap adjuster comprises a single-threaded strap adjuster with a single opening through which the first strap is threaded.

11. The apparatus of claim 1, wherein at least one of:
the first strap is coupled to the first strap adjuster via insert molding; or
the second strap is coupled to the second strap adjuster via insert molding.

12. The apparatus of claim 1, wherein at least one of:
the first strap is coupled to the first strap adjuster using an adhesive; or
the second strap is coupled to the second strap adjuster using the adhesive.

13. A system comprising:
an artificial-reality headset;
a first strap comprising a distal portion coupled to the artificial-reality headset via a mechanical linkage that enables the distal portion of the first strap to rotate relative to the artificial-reality headset;
a second strap that is positioned to at least partially overlap the first strap and that comprises a distal portion coupled to the artificial-reality headset;
a strap adjustment mechanism comprising:
a first strap adjuster, wherein a proximal portion of the first strap is coupled to the first strap adjuster and the second strap is threaded through the first strap adjuster; and
a second strap adjuster, wherein a proximal portion of the second strap is coupled to the second strap adjuster and the first strap is threaded through the second strap adjuster.

14. The system of claim 13, wherein:
the second strap is threaded through the first strap adjuster via an opening dimensioned to provide resistance to movement of the second strap; and
the first strap is threaded through the second strap adjuster via an opening dimensioned to provide resistance to movement of the first strap.

15. The system of claim 14, wherein the openings in the first and second strap adjusters are dimensioned to maintain a position of the strap adjustment mechanism while the first and second straps holds the artificial-reality headset against a face of a user.

16. The system of claim 14, wherein the openings in the first and second strap adjusters are dimensioned to enable a user to adjust a position of the strap adjustment mechanism while the artificial-reality headset is being held against a face of the user by the first and second straps.

17. The system of claim 13, wherein
the distal portion of second strap is attached directly to the artificial-reality headset.

18. The system of claim 13, wherein:
the artificial-reality headset comprises a rigid support frame element dimensioned to physically support a display of a head-mounted display system in front of eyes of a user when the artificial-reality headset is worn by the user;
the artificial-reality headset comprises a flexible facial interface frame element configured to flex to conform to facial features of the user when the artificial-reality headset is worn by the user;
an outer periphery of the flexible facial interface frame element is independently movable relative to an outer periphery of the rigid support frame element; and
the distal portions of the first and second straps are coupled to the rigid support frame element.

19. A method of forming a strap-adjustment mechanism, the method comprising:
threading a proximal portion of a first strap through an opening in a first strap adjuster;
coupling the proximal portion of the first strap to a second strap adjuster;
threading a proximal portion of a second strap through an opening in the second strap adjuster;
coupling the proximal portion of the second strap to the first strap adjuster; and
coupling a distal portion of the first strap to a first side of an artificial reality headset via a mechanical linkage that enables the distal portion of the first strap to rotate relative to the head-mounted display.

20. The method of claim 19, further comprising:
coupling a distal portion of the second strap to a second side of the artificial reality headset opposite the first side.

\* \* \* \* \*